(12) United States Patent
Martins (10) Patent No.: US 11,099,263 B2
(45) Date of Patent: Aug. 24, 2021

(54) AUTOMATIC TIME GAIN COMPENSATION (TGC) IN ULTRASOUND IMAGING

(71) Applicant: B-K Medical Aps, Herlev (DK)

(72) Inventor: Bo Martins, Rodovre (DK)

(73) Assignee: BK Medical APS, Herlev (DK)

( * ) Notice: Subject to any disclaimer, the term of this patent is extended or adjusted under 35 U.S.C. 154(b) by 529 days.

(21) Appl. No.: 16/068,951

(22) PCT Filed: Jan. 11, 2016

(86) PCT No.: PCT/IB2016/050110
§ 371 (c)(1),
(2) Date: Jul. 10, 2018

(87) PCT Pub. No.: WO2017/122042
PCT Pub. Date: Jul. 20, 2017

(65) Prior Publication Data
US 2019/0018125 A1  Jan. 17, 2019

(51) Int. Cl.
*G01S 15/89* (2006.01)
*G01S 7/52* (2006.01)

(52) U.S. Cl.
CPC ...... *G01S 7/52033* (2013.01); *G01S 15/8915* (2013.01); *G01S 15/8925* (2013.01)

(58) Field of Classification Search
CPC ............. G01S 7/52033; G01S 15/8915; G01S 15/8925
See application file for complete search history.

(56) References Cited

U.S. PATENT DOCUMENTS

| | | | | | |
|---|---|---|---|---|---|
| 5,961,461 | A | * | 10/1999 | Mo | ........................... G06T 5/20 600/443 |
| 6,077,226 | A | * | 6/2000 | Washburn | ................ A61B 8/06 600/443 |

(Continued)

OTHER PUBLICATIONS

International Search Report for PCT/IB2016/050110 published as WO2017/122042 dated Jul. 20, 2017.

(Continued)

*Primary Examiner* — Ian J Lobo
(74) *Attorney, Agent, or Firm* — Anthony M. Del Zoppo, III; Daugherty & Del Zoppo Co., LPA (57) ABSTRACT

An ultrasound imaging system (100) includes a transducer array (102) with a plurality of transducer elements (106) configured to transmit an ultrasound signal, receive echo signals produced in response to the ultrasound signal interacting with structure, and generate electrical signals indicative of the echo signals. The system further includes a beamformer (112) configured to process the electrical signals and generate radio frequency data, an in-phase quadrature processor (114) configured to process the radio frequency data and generate in-phase quadrature data, and a frame processor (116) configured to envelope detect and log compress the in-phase quadrature data, producing compressed envelope data. The system further includes a time gain compensation controller (120) configured to continuously process the in-phase quadrature data and the compressed envelope data and continuously and automatically apply time gain compensation data to an envelope data image. The system further includes a rendering engine (124) configured to display, via a display (124), the time gain compensated envelope data image.

25 Claims, 3 Drawing Sheets

(56) References Cited

U.S. PATENT DOCUMENTS

| | | | |
|---|---|---|---|
| 6,120,446 A | 9/2000 | Ji et al. | |
| 6,423,004 B1* | 7/2002 | Dong | G01S 7/52034 |
| | | | 600/443 |
| 2006/0058657 A1* | 3/2006 | Sathyanarayana | |
| | | | G01S 7/52033 |
| | | | 600/437 |
| 2007/0010742 A1 | 1/2007 | Torp | |
| 2008/0208054 A1* | 8/2008 | Azuma | G01S 15/102 |
| | | | 600/443 |
| 2014/0128737 A1* | 5/2014 | Lee | A61B 8/5207 |
| | | | 600/443 |
| 2016/0081662 A1* | 3/2016 | Denk | A61B 8/54 |
| | | | 600/437 |
| 2017/0135672 A1* | 5/2017 | Pelissier | G01S 7/52033 |

OTHER PUBLICATIONS

Moshavegh Ramin et al., Automated hierarchial time gain compensation for ultrasound imaging Proc. of SPIE vol. 9419, pp. 941904-1 to 941904-9, XP060051516, Mar. 17, 2015.

Moshavegh Ramin et al., Advanced automated gain adjustments for in-vivo ultrasound imaging, 2015 IEEE International Ultrasonics Symposium, pp. 1-4, XP032799287, Oct. 21, 2015.

\* cited by examiner

FIGURE 3

AUTOMATIC TIME GAIN COMPENSATION (TGC) IN ULTRASOUND IMAGING

RELATED APPLICATION

This application is a national filing of PCT application Serial No. PCT/IB2016/050110, filed Jan. 11, 2016, published as WO2017/112042 on Jul. 20, 2017. This application claims priority to PCT application Serial No. PCT/IB2016/050110, published as WO2017/112042 on Jul. 20, 2017.

TECHNICAL FIELD

The following generally relates to ultrasound imaging and more particularly to automatic time gain compensation (TGC) in ultrasound imaging, with or without any manual TGC adjustment.

BACKGROUND

Ultrasound imaging can be used to provide one or more real-time images (e.g., B-mode images, etc.) of information about the interior of a subject such as an organ, tissue, blood, etc., or an object. However, ultrasound images are subject to a variation of pixel intensity (brightness) due to patient variability, the contact between patient and transducer, the mode of operation of the ultrasound system (e.g., fundamental mode vs. harmonic mode, reduced voltage mode, etc.), etc. An adjustable gain, implemented through a time gain compensation (TGC) control, has been used to adjust the gain of the image in an attempt to mitigate such intensity variation. For example, a TGC control has been used to increase the received signal intensity with depth to reduce image intensity non-uniformity of the image and/or to maintain a uniform intensity of the soft tissue of the image.

Ultrasound imaging systems have included automatic TGC algorithms and TGC controls (e.g., physical and/or software based sliders, dials, etc.) configured to allow a sonographer to manually adjust the gain. In one approach, the sonographer locates an image he/she considers to be clinically important and then activates automatic TGC. The system then determines a TGC curve for this image and applies the TGC curve to subsequent images. In another approach, the system automatically adjusts the TGC at various times during the imaging procedure. The frequency of adjustment has been based on, e.g., frame rate so as not to reduce the processing bandwidth for generating and displaying images. However, changes in the acoustic window, the amount of fatty tissue, reflecting surfaces in different windows, depth, etc. may result in intensity changes between TGC adjustments. Unfortunately, this may lead to observable brightness flickering with a TGC update, which can be visually distracting and annoying to the sonographer.

SUMMARY

Aspects of the application address the above matters, and others.

In one aspect, an ultrasound imaging system includes a transducer array with a plurality of transducer elements configured to transmit an ultrasound signal, receive echo signals produced in response to the ultrasound signal interacting with structure, and generate electrical signals indicative of the echo signals. The system further includes a beamformer configured to process the electrical signals and generate radio frequency data, an in-phase quadrature processor configured to process the radio frequency data and generate in-phase quadrature data, and a frame processor configured to envelope detect the in-phase quadrature data and log compress it, producing compressed envelope data. The system further includes a time gain compensation controller configured to continuously process the in-phase quadrature data and the compressed envelope data and continuously and automatically apply time gain compensation data to an envelope data image. The system further includes a rendering engine configured to display, via a display, the time gain compensated envelope data image.

In another aspect, a method includes processing electrical signals indicative of ultrasound echo signals received by transducer elements of an ultrasound transducer array to produce envelope data and in-phase quadrature data. The method further includes determining, continuously with a processor, whether to apply existing time gain compensation data or generate time gain compensation data. The method further includes in response to determining to generate the time gain compensation data, processing, with the processor, the in-phase quadrature data and the envelope data to determine the time gain compensation data and then applying the determined time gain compensation data to the envelope data. The method further includes in response to determining to use the existing time gain compensation data, applying, with the processor, the existing time gain compensation data to the envelope data. The method further includes visually presenting the time gain compensated envelope data image.

In another aspect, apparatus includes a transducer array that receives ultrasound echoes produced in response to a pressure field interacting with moving structure and generates electrical signals indicative thereof. The apparatus further includes a console in electrical communication with the transducer array. The console includes a frame processor configured to envelope detect and log compress the electrical signals and produced envelope data. The console further includes an in-phase quadrature processor configured to process electrical signals and generate in-phase quadrature data. The console further includes a processor configured to continuously and alternatively generate time gain compensation data from the in-phase quadrature data and the envelope data and apply the generated time gain compensation data to the envelope data in a first mode of operation, or apply existing time gain compensation data to the envelope data in a second mode of operation. The console further includes a display configured to display the time gain compensated envelope data.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

Figure 1:
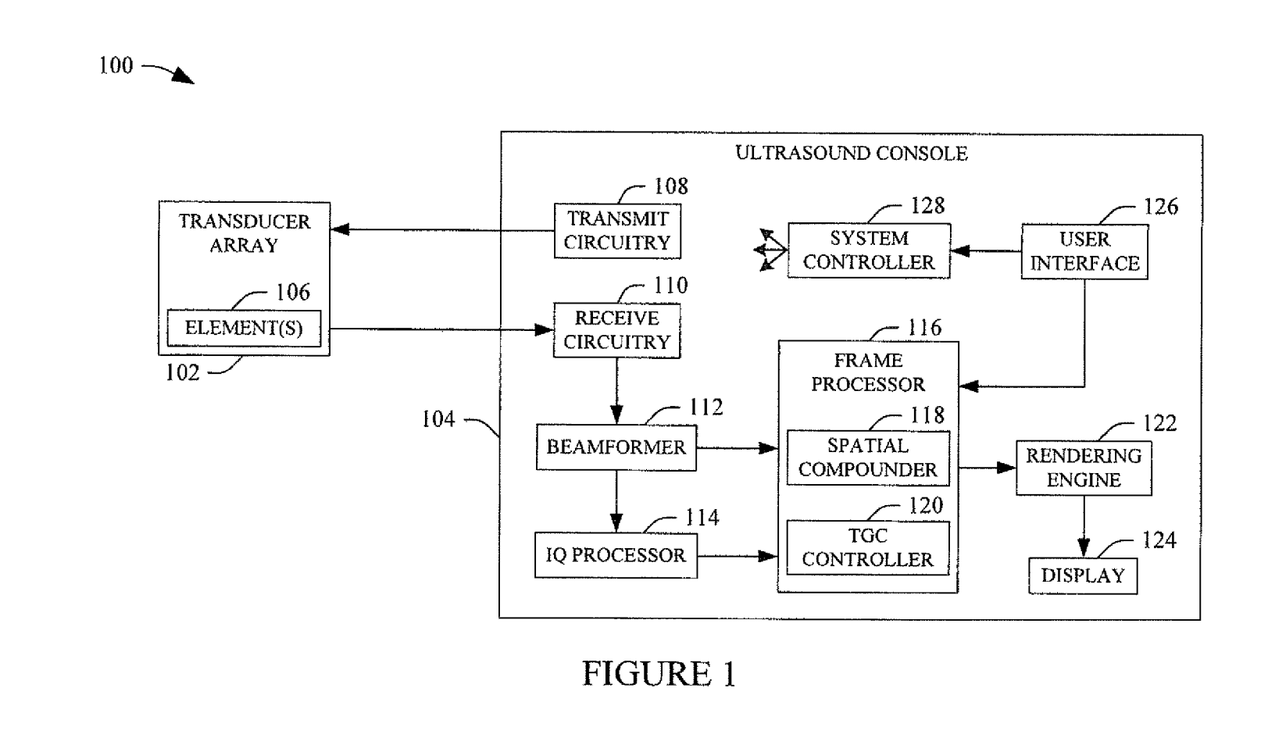
FIG. 1 schematically illustrates an example ultrasound imaging system with a time gain compensation (TGC) controller.

FIG. 1 illustrates an example imaging system 100 such as an ultrasound imaging system. The imaging system 100 includes a transducer array 102 and an ultrasound console 104, which interface through suitable complementary hardware and/or wireless interfaces (not visible).

The transducer array 102 includes one or more transducer elements 106. Examples of suitable one-dimensional arrays include 64, 128, 192, 256, etc. Two-dimensional arrays can be square, rectangular, circular, irregular, etc. The transducer array 102 can include linear, curved, etc. arrays, which are fully populated, sparse and/or a combination thereof, etc.

The elements 106 convert an excitation electrical (e.g., pulsed) signal to an ultrasound pressure field, and at least a sub-set of the elements 106 are excited to transmit. The transducer array 102 can transmit beams at a same or different angles relative to a face of the transducer array via electronic and/or mechanical steering or focusing. Transmit circuitry 108 is configured to generate the excitation electrical signal and convey the excitation electrical signal to the elements 106 of the transducer array 102.

The elements 106 also receive echo signals and generate analog electrical signals indicative thereof. The echo signals, in one instance, are generated in response to the transmitted pressure field interacting with structure, stationary and/or moving. Receive circuitry 110 is configured to receive and condition the analog electrical signals. The conditioning may include at least amplifying the signals with an amplifier. Other processing includes digitizing the signals with an analog-to-digital converter.

A beamformer 112 is configured to beamform the signals from the receive circuitry 110. The beamformer 112 can include conventional, synthetic aperture, plane wave, row-column, and/or one or more other beamformers. For B-mode imaging, the beamforming may include delaying the signals from each of the elements 106 and summing the delayed signals, producing radiofrequency (RF) data.

An in-phase quadrature (IQ) processor 114 is configured to at least convert the RF-data to the complex-value IQ domain, producing IQ data. This can be achieved by multiplying the RF-signal by a complex sinusoid signal, e.g., I=RF x cos(wt), and Q=RF x-sin(wt). The IQ data can be further processed, e.g., low pass filtered, decimated, etc.

A frame processor 116 is configured to process the RF-data and/or the IQ data. For example, in one instance, the frame processor 116 uses the IQ data for generating envelope data by computing the amplitude of the (complex) IQ signal for every sample in every scan line. In another instance, the frame processor 116 filters the RF-data with a filter such as a finite impulse response (FIR), an infinite impulse response (IIR) filter, or other filter. In that case, the frame processor 116 runs the filtered RF-data through an envelope detector. The frame processor 116 log compresses the envelope data into a grayscale format, downscales the compressed data, e.g., to reduce the load for subsequent processing, and/or otherwise processes the data.

The illustrated frame processor 116 includes a spatial compounder 118. Spatial compounding is the process of aligning and combing frames of the same structure, which are acquired at different times and at different angles of insonation, to form a single compounded frame. The individual frames can be obtained by holding the transducer at a fixed position and transmitting the beam at different angles via electronic beam steering and/or electronically or manual controlled mechanical steering of the array.

Alignment can be done based on geometric transforms using the transducer array geometry constants as well as the applied steering angles, the sampling frequency, the speed of sound in the insonated tissue, etc. An example of spatial compounding which takes transducer and/or tissue motion into account is described in application Ser. No. 13/812,883, publication number US 2013/0128691 A1, filed on Jan. 29, 2103, and entitles "Motion-Compensated Processing," which is incorporated by reference in its entirety herein.

A TGC controller 120 is configured to provide TGC. This includes fully automatic and continuously adapting TGC and/or on-demand TGC. Suitable modes include at least one of axial TGC, axial-lateral TGC, axial-lateral-overall TGC, and axial-overall TGC. In general, and as described in greater detail below, the TGC controller 120 receives, as input, the IQ data and the envelope data (compounded or not), and either applies an existing TGC or computes and applies TGC.

To distinguish far field noise and fluid from tissue, the TGC controller 120 computes a cross-correlation image between current and previously received IQ-data. In one instance, at least four (4) frames of data are processed. Where spatial compounding is employed, N*4 frames are processed, where N is the number of different angles (e.g., 3, 5, etc.), where only the straight shot images are used for cross-correlation. Strong reflectors are identified by the derivative of the brightness. Strong reflectors in a very dark near field can be identified and masked out giving a better near field correction.

The TGC applied by the TGC controller 120 provides uniform brightness (speckle level) of the soft tissue in the B-mode image, without increasing the gain in areas of fluid and/or noise. For constant speckle level and neutral gain compensation in a noise-dominated far field, a speckle identification mask is used to create a mask for far field noise. As opposed to the speckle identification mask, which is designed to have holes the size of vessels or reflectors, the far field noise mask is processed so that it is very likely to change from "tissue" to "far field" only once for each scan line.

The area distal to the tissue/far field border is used in a particular way to create a gain compensation matrix. This area is filled with the overall median (or mean) value of a cleansed image, i.e. the image stripped from far field noise, vessels, and strong reflectors. Neither the vessel areas nor the areas of strong reflectors are used when computing the gain compensation matrix. The median (or mean) filters are designed in a particular way so as to skip these areas and to reach across them so that brightness estimates can be made even in areas without patches of speckle.

The TGC controller 120 can adapt to current image content continuously so that the brightness is the same regardless of the acoustic window, the amount of fatty tissue, reflecting surfaces in the different windows, depth, etc. Furthermore, the TGC controller 120 can adapt the image so that the user does not notice the adaptation (e.g., mitigates brightness flickering). The console 104 can be configured to automatically activate the TGC controller 120, e.g., via a default or user configuration file, and the user does not have to activate the TGC controller 120. In a variation, the user activates the TGC controller 120 via a keyboard and/or touchscreen button, a drop down menu, etc.

A rendering engine 122 visually presents, via a display 124, images. The rendering engine 122 can be used for filtration, enhancement processing, and the like. If the coordinate system of the images entering the rendering engine 122 are different from that of the display 124, a scan converter converts the images to map then to the coordinate system of the display 124. The scan converter can be configured to employ analog and/or digital scan converting techniques to map the images to the display 124.

A user interface (UI) 126 includes one or more input devices (e.g., a button, a knob, a slider, a touch pad, a mouse, a trackball, a touch screen, etc.) and/or one or more output devices (e.g., a display screen, a light, an audio generator, etc.), which allow for interaction between a user and the ultrasound imaging system 100. This includes allowing the sonographer to turn on or off an automatic and/or on-demand TGC mode, manually adjust TGC, etc.

A system controller 128 is configured to control one or more of the components of the console 104, the transducer array 102, and/or other device. For example, in one instance, the system controller 128 controls the transmit circuit 108 to control the number of scanline groups, transmit angles, transmit energies, transmit frequencies, transmit and/or receive delays, etc. Such control can be based on configuration files, user input, a selected mode of operation, etc.

One or more of the components of the console 104 can be implemented via one or more processors (CPU, microprocessor, controller, etc.) executing one or more computer readable instructions encoded or embedded on computer readable storage medium, which is a non-transitory medium such as physical memory or other non-transitory medium, and excludes transitory medium. Additionally, or alternatively, at least one of the instructions can be carried by a carrier wave, a signal, or other transitory medium.

The ultrasound imaging system 100 can be part of a portable system on a stand with wheels, a system residing on a tabletop, and/or other system in which the transducer array 102 is housed in a probe or the like, and the console 104 is housed in an apparatus separate therefrom. In another instance, the transducer array 102 and the console 104 can be housed in a same apparatus such as within a single enclosure hand-held ultrasound scanning device.

Figure 2:
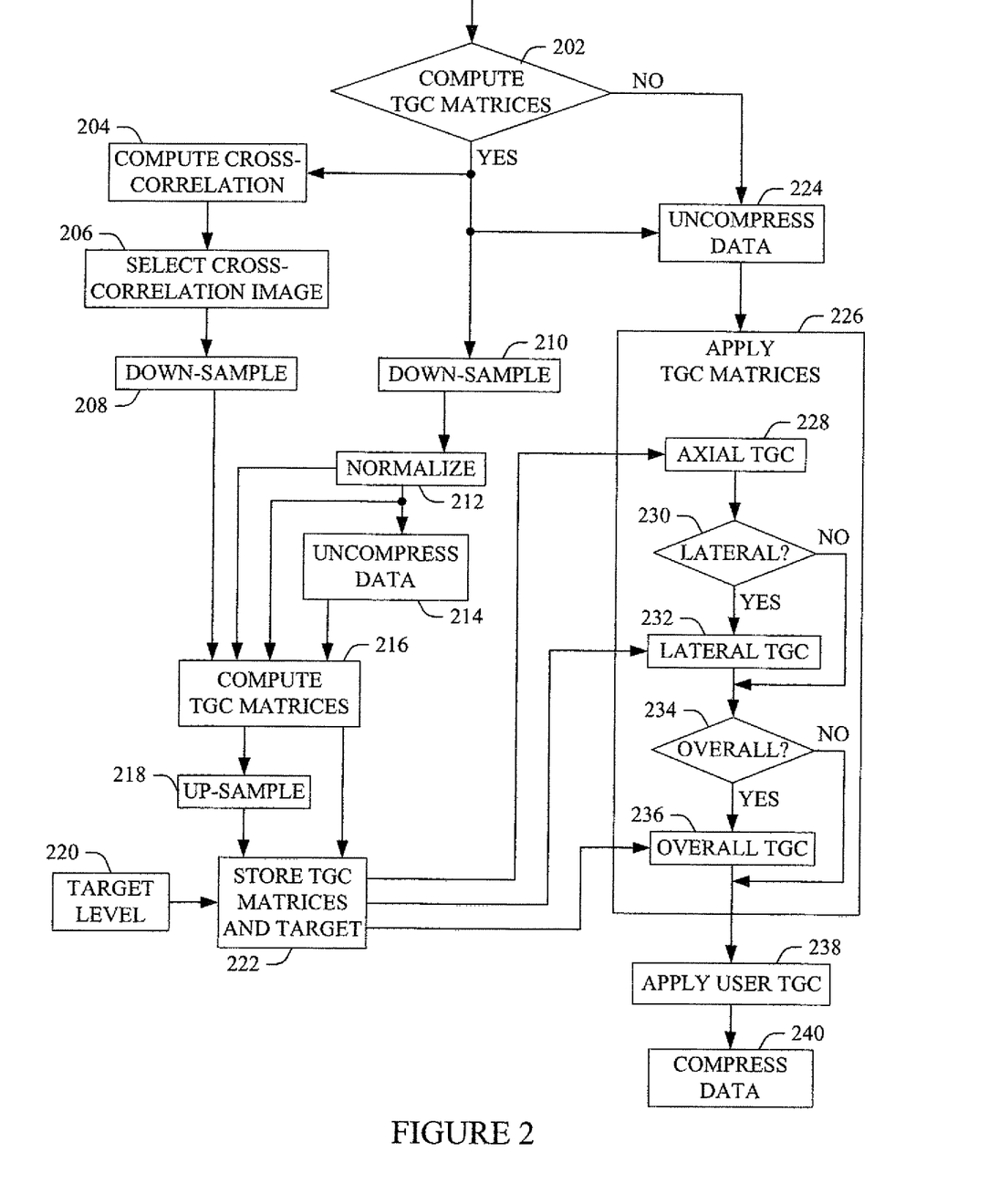
FIG. 2 illustrates an example method for TGC control.

FIG. 2 illustrates an example method implemented by the TGC controller 120.

It is to be understood that the following acts are provided for explanatory purposes and are not limiting. As such, one or more of the acts may be omitted, one or more acts may be added, one or more acts may occur in a different order (including simultaneously with another act), etc.

The input to the TGC controller 120 is the IQ data and the envelope data. If the user manually adjusts, via the user interface 126 and/or otherwise, the TGC after the automated TGC control, the manual adjustment is also provided to the TGC controller 120 as an input.

At 202, the frame processor 116 receives a frame of IQ and envelope data and determines whether TGC matrices are to be computed. In one instance, TGC matrices are computed every frame. In another instance, TGC matrices are not computed every frame. In this instance, the determination can be based on frame rate (e.g., so as not to consume processing cycles which will visibly slow down other processing), system load, a predetermined interval (e.g., that would mitigate visible intensity flickering observable by the user, once only, on-demand, etc.), a number frames compounded, a default or user setting, and/or otherwise. For example, the TGC matrices can be computed every fourth frame, every tenth frame, less frames, more frames, a number of frames between the four and ten, a variable number of frames (e.g., based on other concurrent processing), a predetermined frequency (e.g., one hundred Hertz), etc.

If the TGC matrices are to be computed, acts 204-238 are implemented. If not, only acts 224-238 are implemented using previously stored TGC information, such as that discussed in connect with act 222.

At 204, a cross-correlation image is computed between currently received IQ data and previously received IQ data.

At 206, a largest value is selected, element-wise, from a set of the recently computed cross-correlation images. For example, where the set includes the three most recently computed cross-correlation images, the selection would be made amongst the cross-correlation images computed for the Nth and the (N−1) IQ data, the (N−1) and the (N−2) IQ data, and the (N−2) and the (N−3) IQ data. Choosing the largest value may mitigate sensitivity to motion. A more computationally demanding but better performing operation in the presence of large motion is motion-compensated cross-correlation.

At 208, the selected values are down-sampled, and, at 210, the envelope data is down-sampled. This reduces the amount of samples for computing the TGC matrices. The amount of reduction is determined by the available processing power. For example, in one non-limiting instance, the down sampling at 210 aims at getting approximately 250 axial samples and approximately 200 lateral samples in the downscaled image.

At 212, the down-sampled envelope data is normalized, e.g., over a range of zero (0) to one (1), producing logData.

At 214, the normalized envelope data is uncompressed.

Figure 3:
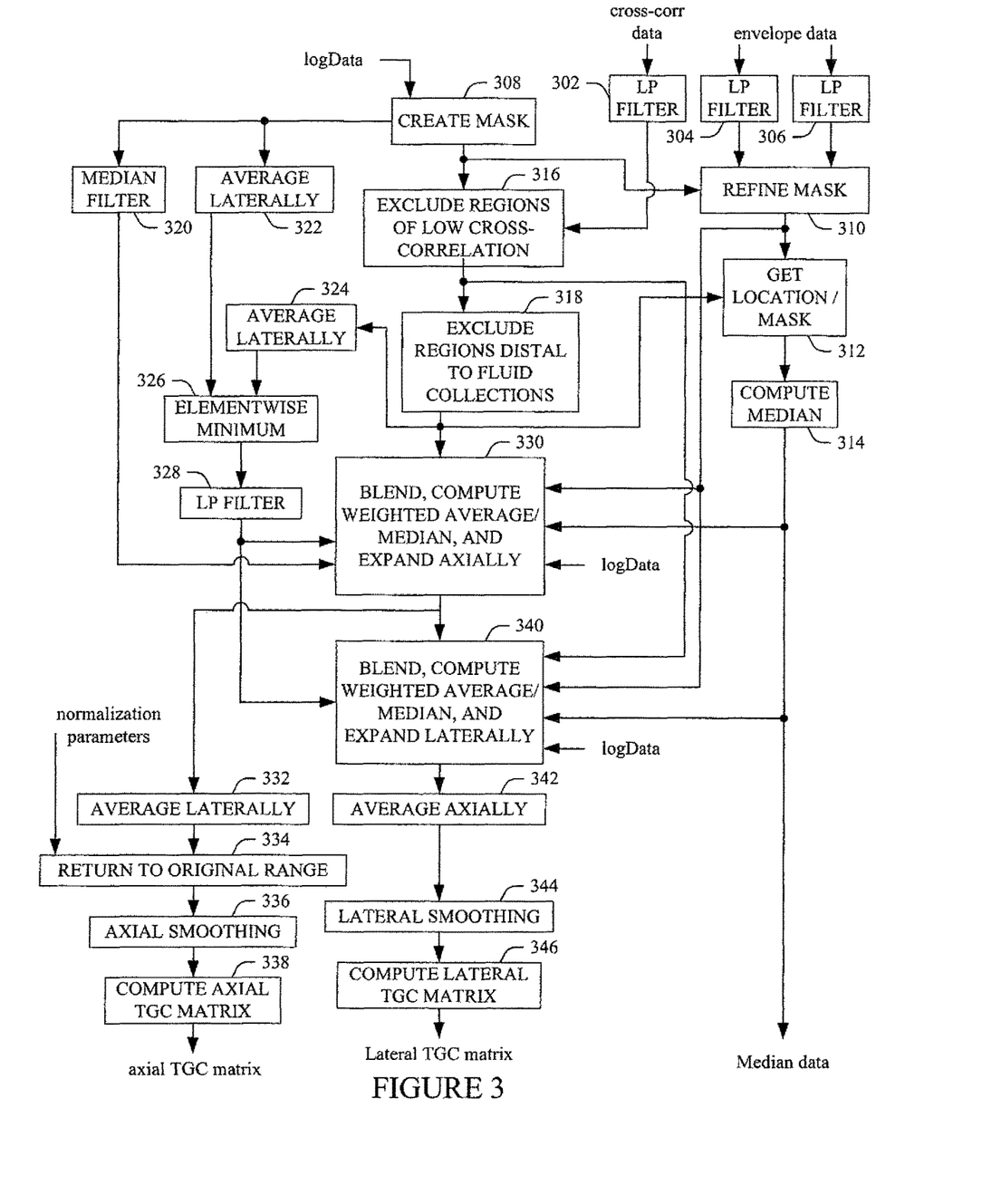
FIG. 3 illustrates an example method for computing TGC matrices.

At 216, axial and lateral TGC matrices and a median of the envelope data are computed based on the down-sampled selected cross-correlation data, the logData, the normalization parameters, and the uncompressed envelope data. FIG. 3 provides an example of computing this data.

At 218, the axial and lateral TGC matrices are up-sampled, e.g., back to the sampling of the envelope data images.

At 220, an overall gain target brightness level is obtained.

At 222, the axial and lateral matrices, the median data, and the target brightness level are stored.

At 224, the received envelope data is uncompressed.

At 226, one or more of the TGC matrices are applied to the uncompressed envelope data as shown in acts 228, 230 and 232.

At 228, the axial TGC matrix is applied to the uncompressed envelope data. In one instance, this includes multiplying the axial TGC matrix and the uncompressed envelope data, producing an axial compensated envelope data image.

At 230, it is determined whether lateral gain compensation is selected to be applied.

If so, then at 232, the lateral TGC matrix is multiplied with the axial compensated envelope data image, producing an axial-lateral compensated envelope data image. Otherwise, the lateral TGC matrix is not applied to the axial compensated envelope data image.

At 234, is it determined whether overall gain compensation is selected to be applied.

If so, then at 236, a difference is determined between the median data and the target brightness level in log compressed domain. The difference is converted to a multiplication factor in the uncompressed domain, e.g., as ten (10) to the power of the difference divided by a constant that represents the shape of the log compression function. The multiplication factor may be multiplied with the axial compensated envelope data image or the axial-lateral compensated envelope data image, producing an axial-lateral-overall or an axial-overall compensated envelope data image. In order not to enhance far field noise by the overall compensation, the multiplication factor is modified as a function of depth. Distal to the depth where noise is dominating, the multiplication factor being used is one (1). The multiplication factor is changed linearly in a band of transition whose midpoint is the penetration depth. The penetration depth can be estimated from the cross-correlation data or from off-line measurements or from rules-of-thumb, such as 500 wavelengths in fundamental mode.

If overall gain compensation is not selected to be applied, the difference between the median data and the target brightness level is not computed and a multiplication factor is not applied.

The result of the acts 228-236 is one of: the axial compensated envelope data image, the axial-lateral compensated envelope data image, the axial-lateral-overall compensated envelope data image or the axial-overall compensated envelope data image.

At 238, any user TGC is applied to the output of act 226. For example, where the user manually adjusts TGC via a keyboard control, a touchscreen control, software pointer (mouse) activated control, etc., the user indicated TGC is applied. Where the user has not adjusted the TGC, this step is omitted.

At 240, the gain adjusted envelope data image is compressed.

The compressed data is then conveyed to the rendering engine 122 and displayed.

FIG. 3 illustrates an example method for computing the data of act 216 of FIG. 2.

It is to be understood that the following acts are provided for explanatory purposes and are not limiting. As such, one or more of the acts may be omitted, one or more acts may be added, one or more acts may occur in a different order (including simultaneously with another act), etc.

From act 216 of FIG. 2, the input includes the downsampled selected cross-correlation data ("cross-corr data"), the logData, the normalization parameters, and the downsampled and uncompressed envelope data ("envelope data").

At 302, the cross-correlation data is filtered. In one instance, this data filtered with a 2D low-pass filter.

At 304 and 306, the envelope data is filtered. In one instance, this data filtered through two independent processing chains, respectively with a first 2D low-pass filter having a first size (304) (e.g., 2*floor(downsampledRows/128)+1), and a second 2D low-pass filter having a second size (306) (e.g., 2*floor(downsampledRows/32)+1). Here, downsampledRows denotes the number of axial samples in logData. The difference between the output of these two filters is large in areas of very large gradients. These areas are not dominated by soft tissue but contain reflecting structures such as the diaphragm and are excluded at 310.

At 308, a mask to indicate the location of samples of soft tissue is produced. In 308, areas likely to contain fluid or noise are excluded. These areas are computed using thresholding of the normalized log compressed image logData.

At 310, the mask of soft tissue areas is refined as areas of reflecting structures (bright areas) as computed from the difference between the outputs from 304 and 306 are also excluded.

At 312, the final location/mask of trusted tissue samples is obtained from the output of 310 and 318. The areas excluded from the output of 318 are those for which cross-correlation is very low or from tissue samples distal to large fluid collections. Cross-correlation is very low in regions of fluid, noise or a mixture of tissue and fluid or noise.

At 314, a median ("Median data") of the trusted samples is computed from the output of 312. The median data is a scalar.

At 316, regions of low cross-correlation (noise and non-dark fluid) are soft-excluded from the masked data using the cross-correlation data. Here, soft-exclusion means that the output mask is not binary anymore, but that it represents a fidelity metric indicating to what extent a particular sample is treated as a soft tissue sample. The fidelity for a sample is based on the magnitude of a local estimate of the cross-correlation relative to the average cross-correlation in the near-field. The fidelity for samples for which the local cross-correlation is less than half the near-field cross-correlation is set to zero. The concept of non-binary fidelity for a particular sample is useful to obtain a smooth transition between the desired amplification of tissue signal when there is little noise and non-amplification of a tissue signal in presence of significant noise.

At 318, regions distal to large fluid collections are then soft-excluded from the output from act 316. The rationale for excluding these samples is that enhancement occurs distal to large fluid collections and that these areas, even if populated by tissue samples, be treated as non-representative for the soft tissue samples being used for computing the TGC matrices. Large fluid collections are identified by low values in a low-pass filtered image of the relative cross-correlation (the fidelity image). The lowest value in this filtered fidelity image in the current image line ranging from some start depth to the depth of the current sample is being used together with the output from 316 to form the output of 318.

At 320, the mask is median filtered.

At 322, the mask is averaged laterally, generating a one-dimensional (1-D) array.

At 324, the data from 318 is averaged laterally, generating a 1-D array.

At 326, a minimum is selected, element-wise, from the laterally averaged data from 322 and 324.

At 328, the minimum is filtered, e.g., with a 1-D low pass filter.

At 330, every sample of the logData is blended with the Median data depending on the associated fidelity of the sample, a regional weighted average/median is computed using trusted samples only, and the region is expanded axially until enough trusted samples are within the region, resulting in a featureless, blended and smoothed version of logData. The inputs include the outputs from acts 310, 314, 320 and 328, and the logData.

At 332, the blended and smoothed logData is averaged laterally, generating a 1-D array/curve. The array/curve expresses the average brightness of the soft tissue at each sample depth of logData.

At 334, the laterally averaged data are processed, using the normalizing parameters, to convert from the normalized range back to the original range of the logarithmically compressed data. This is done by multiplying the scaled data with the original range (i.e. prior to normalization) and adding the original minimum value.

At 336, the output of act 334 is smoothed using a 1-D FIR filter.

At 338, the axial TGC matrix is computed based on the axially smoothed data. This is done by first generating the reciprocal curve of the output of 336 and then populating each scan line of the axial TGC matrix by the reciprocal curve.

At 340, every sample of logData is blended with the Median data depending on the fidelity of the sample, a regional weighted average/median is computed using trusted samples only, and a region is expanded laterally until enough trusted samples are within region, resulting in an image that expresses the average brightness of the soft tissue for each scanline of logData at different, coarsely quantized depths. The inputs include the outputs from acts 310, 314, 316, 328 and 330, and the logData.

At 342, the lateral image is averaged axially, i.e. along scanlines, thereby producing a 1-D array/curve expressing the average brightness of the soft tissue for each scanline of logData.

At 344, the output of act 342 is smoothed using a 1-D FIR filter.

At 346, the lateral TGC matrix is computed based on the laterally smoothed data by populating the reciprocal curve of the output of 344 to every row of the lateral TGC matrix.

From act 226 of FIG. 2, one or more of the TGC matrices are applied to the uncompressed envelope data as shown in acts 228, 230, 232, 234 and 236.

At least a portion of one or more of the methods discussed herein may be implemented by way of computer readable instructions, encoded or embedded on computer readable storage medium (which excludes transitory medium), which, when executed by a computer processor(s), causes the processor(s) to carry out the described acts. Additionally or alternatively, at least one of the computer readable instructions is carried by a signal, carrier wave or other transitory medium.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
    a transducer array with a plurality of transducer elements configured to transmit an ultrasound signal, receive echo signals produced in response to the ultrasound signal interacting with structure, and generate electrical signals indicative of the echo signals;
    a beamformer configured to process the electrical signals and generate radio frequency data;
    an in-phase quadrature processor configured to process the radio frequency data and generate in-phase quadrature data;
    a frame processor configured to envelope detect and log compress the in-phase quadrature data, producing compressed envelope data;
    a time gain compensation controller configured to continuously process the compressed envelope data and the in-phase quadrature data and continuously and automatically apply time gain compensation data to an envelope data image, wherein the time gain compensation controller computes a cross-correlation image between currently received in-phase quadrature data and previously received in-phase quadrature data, selects element-wise a largest value from a set of cross-correlation images, down-samples the selected cross-correlation image, and computes the time gain compensation data based on the down-sampled cross-correlation image; and
    a rendering engine configured to display, via a display, the time gain compensated envelope data image.

2. The system of claim 1, wherein the cross-correlation image is a motion-compensated cross-correlation image.

3. The system of claim 1, wherein the time gain compensation controller down-samples the compressed envelope data, normalizes the down-sampled compressed envelope data producing log data using a set of normalization parameters, and uncompresses the normalized down-sampled compressed envelope data producing uncompressed normalized data, wherein the time gain compensation controller computes the time gain compensation data based on the log data, the uncompressed normalized data, and the set of normalization parameters.

4. The system of claim 3, wherein the time gain compensation controller computes a median or mean value of the uncompressed envelope data, wherein the time gain compensation controller computes the time gain compensation data based on the median value.

5. The system of claim 4, wherein the time gain compensation data includes at least an axial time gain compensation matrix.

6. The system of claim 5, wherein the time gain compensation controller up-samples the axial time gain compensation matrix, multiples the up-sampled axial time gain compensation matrix and uncompressed envelope data image to apply the axial time gain compensation and produce axial time gain compensated envelope data.

7. The system of claim 6, wherein the time gain compensation data further includes a lateral time gain compensation matrix.

8. The system of claim 7, wherein the time gain compensation controller up-samples the lateral time gain compensation matrix, multiples the up-sampled lateral time gain compensation matrix and the axial-time gain compensation envelope data image to apply the lateral time gain compensation and produce axial-lateral time gain compensated envelope data.

9. The system of claim 8, where the time gain compensation controller stores a target brightness level, computes an overall gain multiplication factor based on the difference between the target brightness level and the median value, and multiples the gain and axial-lateral time gain compensated envelope data to apply the overall gain and produce axial-lateral-overall time gain compensated envelope data.

10. The system of claim 9, where the gain multiplication factor varies with depth.

11. The system of claim 10, where the gain multiplication factor equals ten to the power of the difference divided by a constant up to a first depth and is one distal to a second depth, and the gain multiplication factor is changed gradually between the first and second depths, where the first depth is shallower than a penetration depth and the second depth is deeper than the penetration depth.

12. The system of claim 6, where the time gain compensation controller stores a target brightness level, computes an overall gain multiplication factor based on the difference between the target brightness level and the median value, and multiples the overall gain and axial time gain compensated envelope data to apply the overall gain and produce axial-overall time gain compensated envelope data.

13. The system of claim 1, where the time gain compensation controller receives data indicative of a user input to the time gain compensation and applies the user input the time gain compensation to the time gain compensated envelope data image.

14. A method, comprising:
    processing electrical signals indicative of ultrasound echo signals received by transducer elements of an ultrasound transducer array to produce envelope data and in-phase quadrature data;
    determining, continuously with a processor, whether to apply existing time gain compensation data or generate and apply time gain compensation data;

in response to determining to generate and apply the time gain compensation data, processing, with the processor, the in-phase quadrature data and the envelope data to determine the time gain compensation data, including:
   computing a cross-correlation image between currently received in-phase quadrature data and previously received in-phase quadrature data;
   selecting, element-wise, a largest value from a set of cross-correlation images; and
   down-sampling the selected cross-correlation image, wherein the time gain compensation data is determined based on the down-sampled cross-correlation image;
applying the determined time gain compensation data to the envelope data; and
in response to determining to use the existing time gain compensation data, applying, with the processor, the existing time gain compensation data to the envelope data; and
visually presenting the time gain compensated envelope data image.

15. The method of claim 14, where the cross-correlation image is a motion-compensated cross-correlation image.

16. The method of claim 14, further comprising:
down-sampling the envelope data;
normalizing the down-sampled compressed envelope data to produce log data; and
uncompressing the normalized the down-sampled envelope data to produce uncompressed normalized data,
wherein the time gain compensation data is determined based on the log data, the uncompressed normalized data, and the set of normalization parameters.

17. The method of claim 16, further comprising:
computing a median value of the soft tissue part of the envelope data,
wherein the time gain compensation data is determined based on the median value.

18. The method of claim 17, wherein the time gain compensation data includes at least an axial time gain compensation matrix, and further comprising:
   up-sampling the axial time gain compensation matrix; and
   multiplying the up-sampled axial time gain compensation matrix and the uncompressed envelope data image.

19. The method of claim 18, wherein the time gain compensation data further includes a lateral time gain compensation matrix, and further comprising:
   up-sampling the lateral time gain compensation matrix; and
   multiplying the up-sampled lateral time gain compensation matrix and the uncompressed envelope data image.

20. The method of claim 18, further comprising:
computing an overall gain as a difference between a target brightness level and the median value; and
multiplying the overall gain and the uncompressed envelope data image.

21. The method of claim 20, wherein the gain multiplication factor varies with depth.

22. The method of claim 14, further comprising:
receiving a change of interest of the applied time gain compensation; and
adjusting applied time gain compensation based on the received change.

23. An apparatus, comprising:
a transducer array that receives ultrasound echoes produced in response to a pressure field interacting with moving structure and generates electrical signals indicative thereof; and
a console in electrical communication with the transducer array, wherein the console includes:
   an in-phase quadrature processor configured to continuously process electrical signals and generate in-phase quadrature data;
   a frame processor configured to continuously envelope detect and log compress the in-phase quadrature data, producing compressed envelope data;
   a processor configured to continuously and alternatively generate time gain compensation data from the in-phase quadrature data and the envelope data and apply the generated time gain compensation data to the envelope data in a first mode of operation, or apply existing time gain compensation data to the envelope data in a second mode of operation,
   wherein the processor computes a cross-correlation image between currently received in-phase quadrature data and previously received in-phase quadrature data, selects element-wise a largest value from a set of cross-correlation images, down-samples the selected cross-correlation image, and computes the time gain compensation data based on the down-sampled cross-correlation image; and
a display configured to display the time gain compensated envelope data.

24. The apparatus of claim 23, wherein the cross-correlation image is a motion-compensated cross-correlation image.

25. The apparatus of claim 23, wherein the processor down-samples the compressed envelope data, normalizes the down-sampled compressed envelope data producing log data using a set of normalization parameters, uncompresses the normalized down-sampled compressed envelope data producing uncompressed normalized data, and computes the time gain compensation data based on the log data, the uncompressed normalized data, and the set of normalization parameters.

* * * * *